May 5, 1931. W. W. McCAIN 1,803,633
CARTONING MACHINE
Filed Feb. 17, 1928 21 Sheets-Sheet 2

Inventor
Geo. W. McCain
By Wm. O. Belt Atty.

May 5, 1931. W. W. McCAIN 1,803,633
CARTONING MACHINE
Filed Feb. 17, 1928 21 Sheets-Sheet 15

May 5, 1931.  W. W. McCAIN  1,803,633
CARTONING MACHINE
Filed Feb. 17, 1928    21 Sheets-Sheet 16
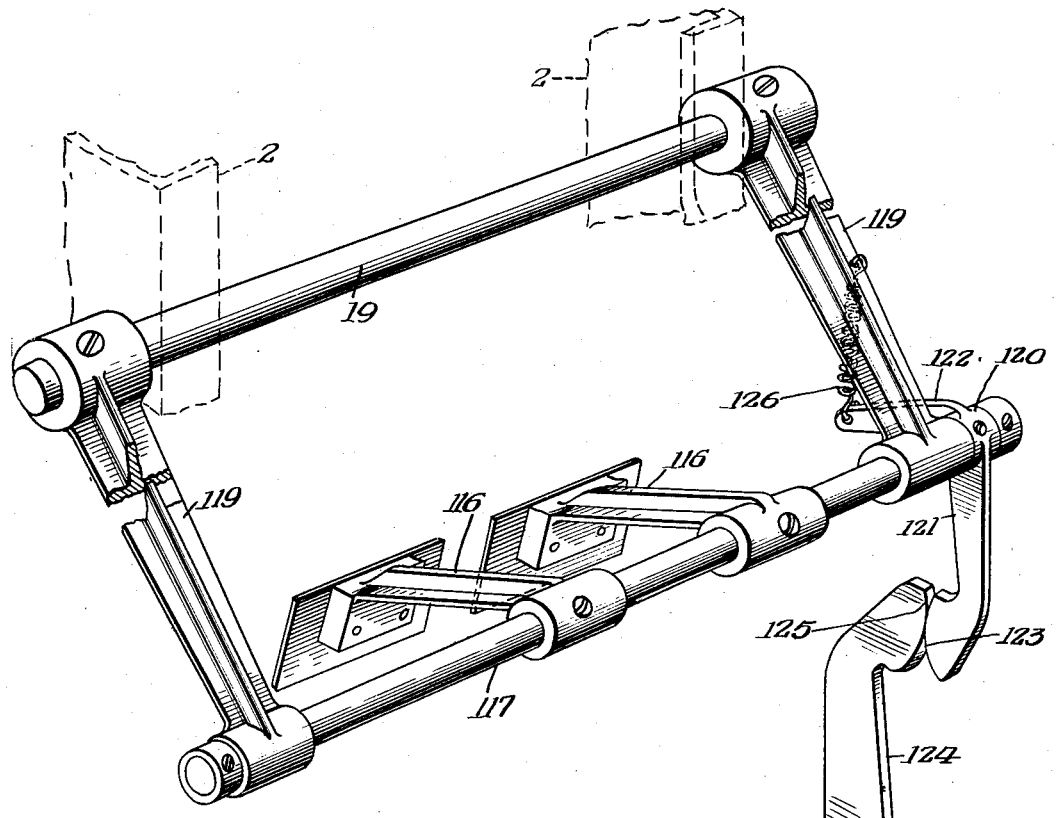
Fig. 17
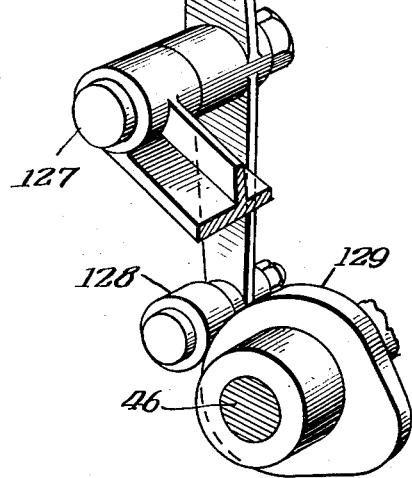
Inventor
Wes W. McCain
By Wm O. Belt  Atty

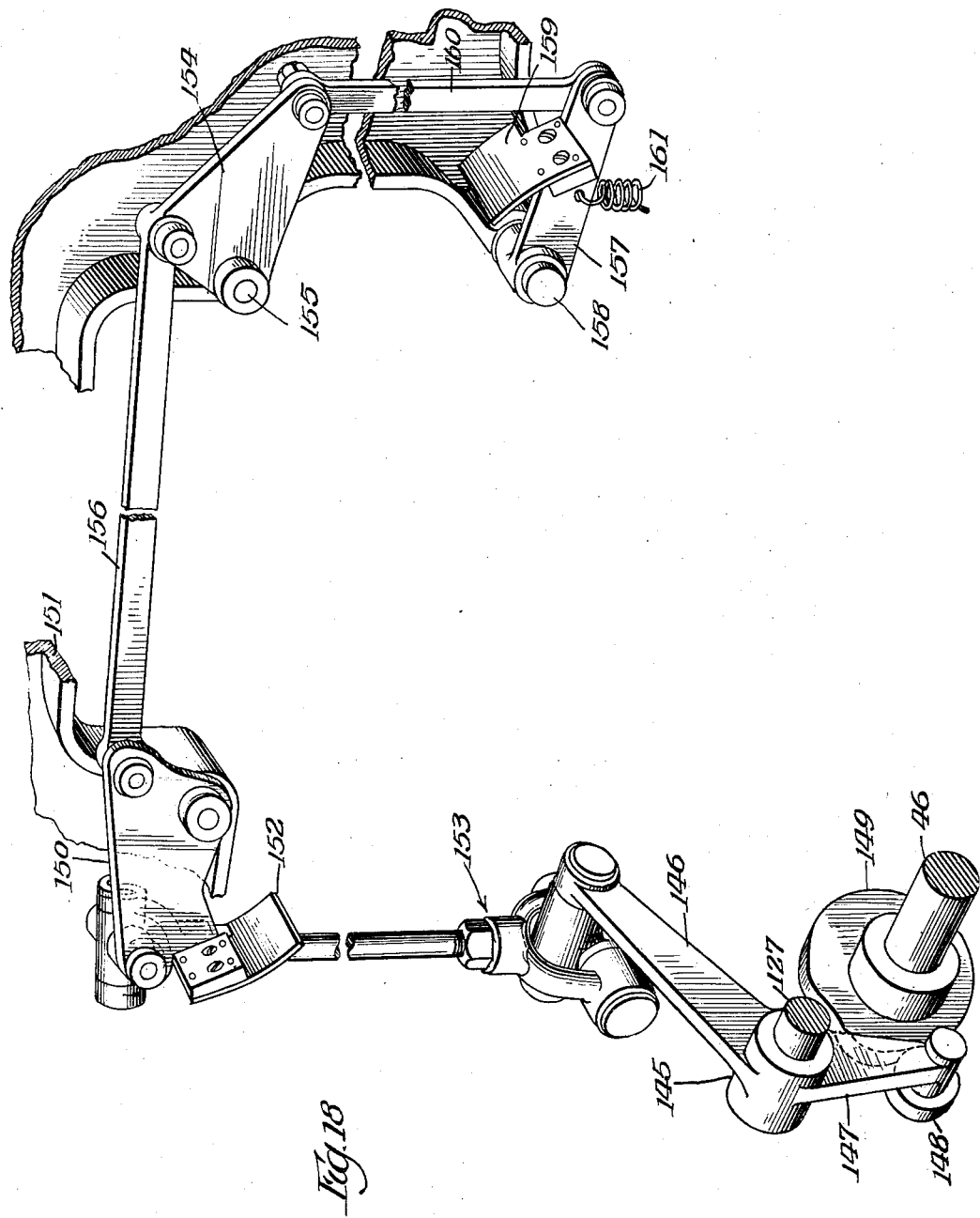

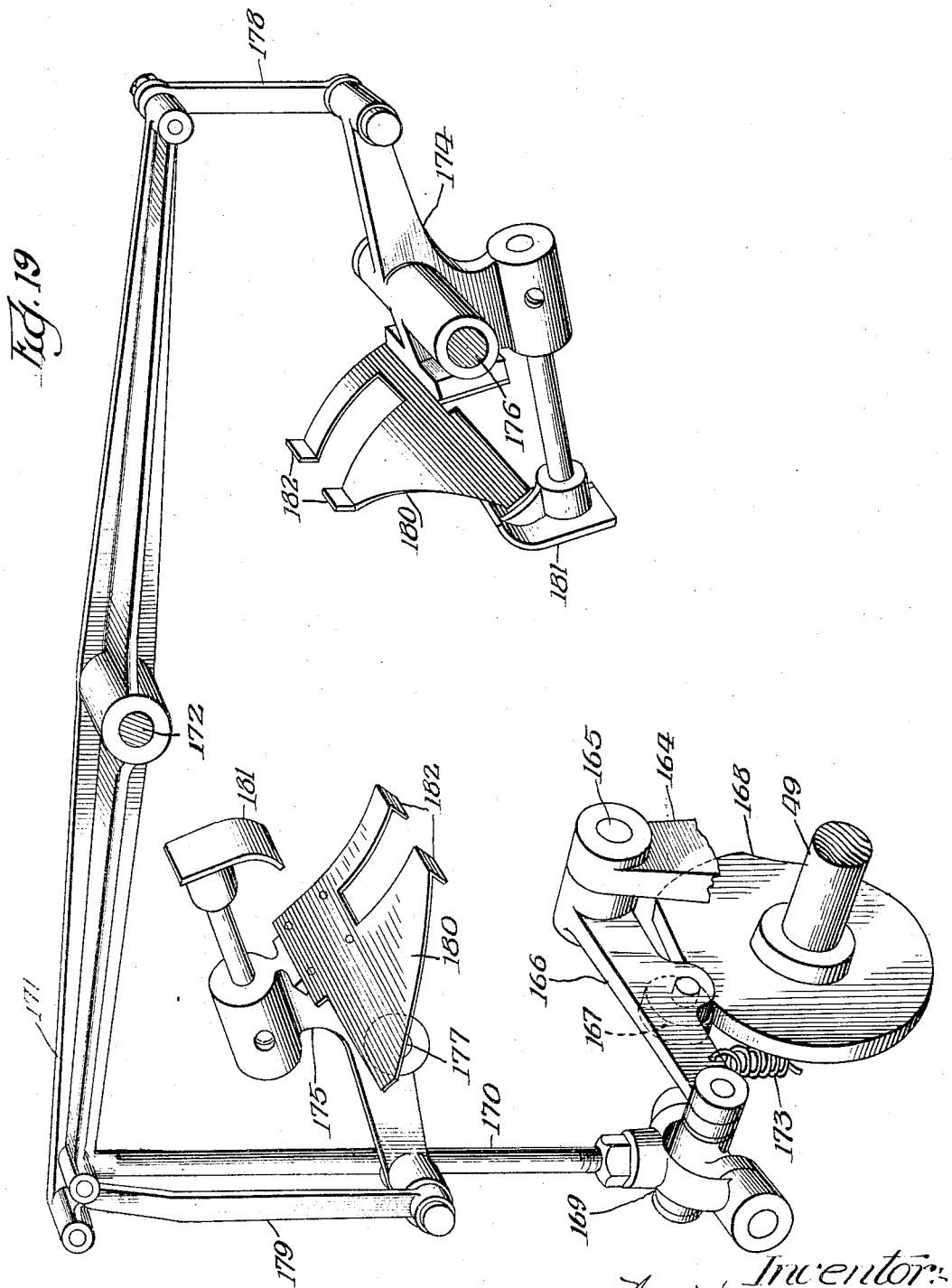

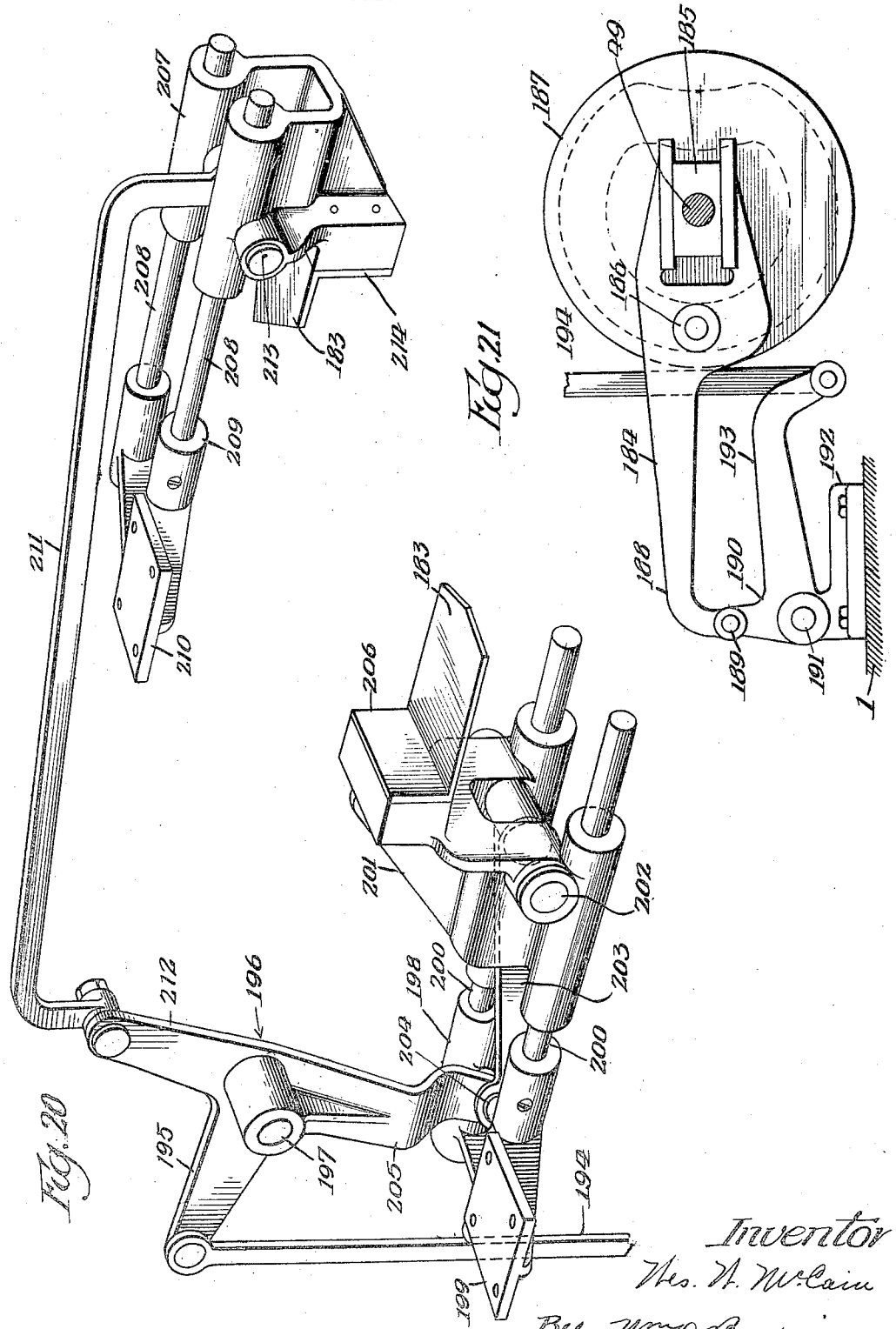

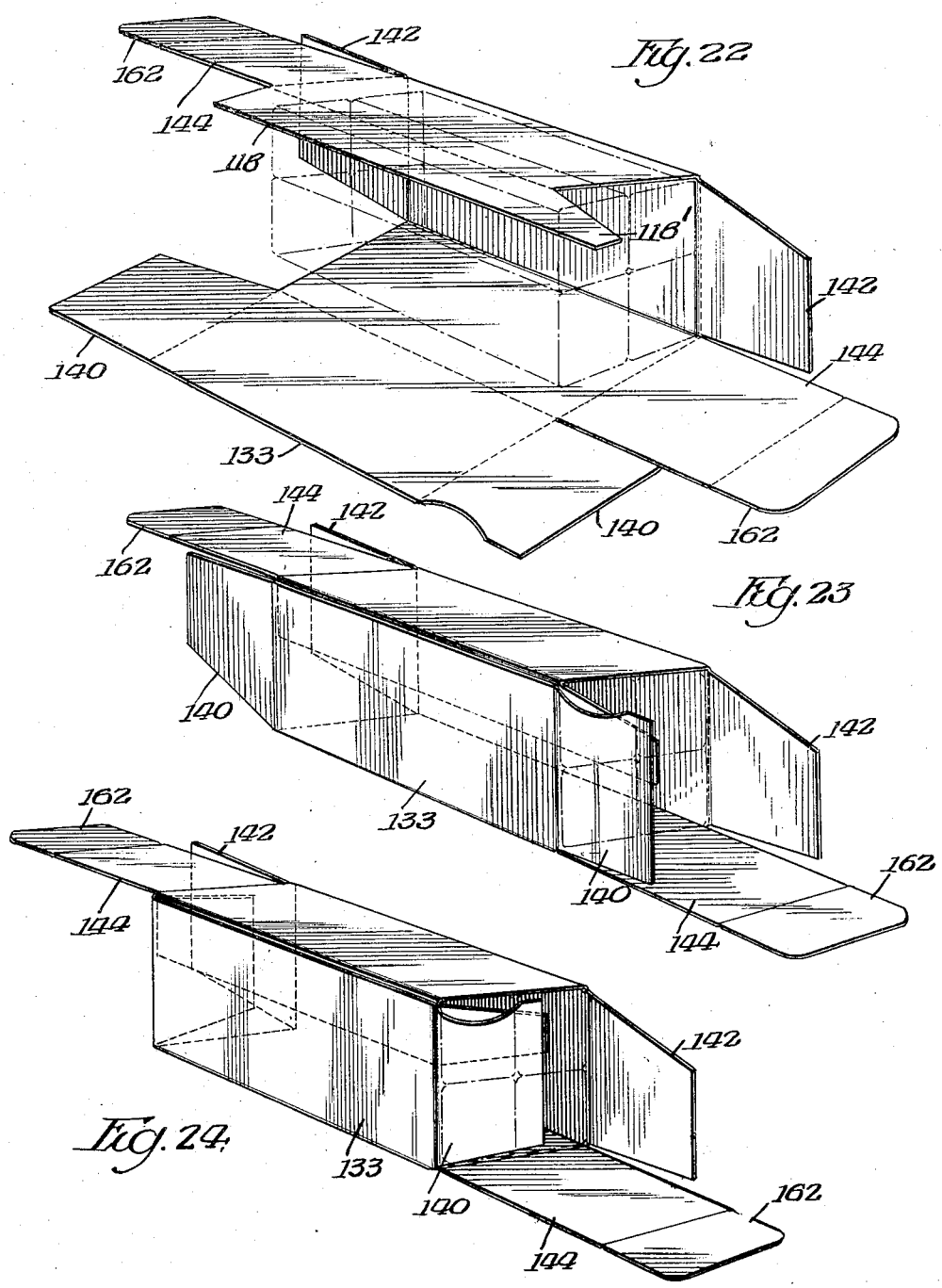

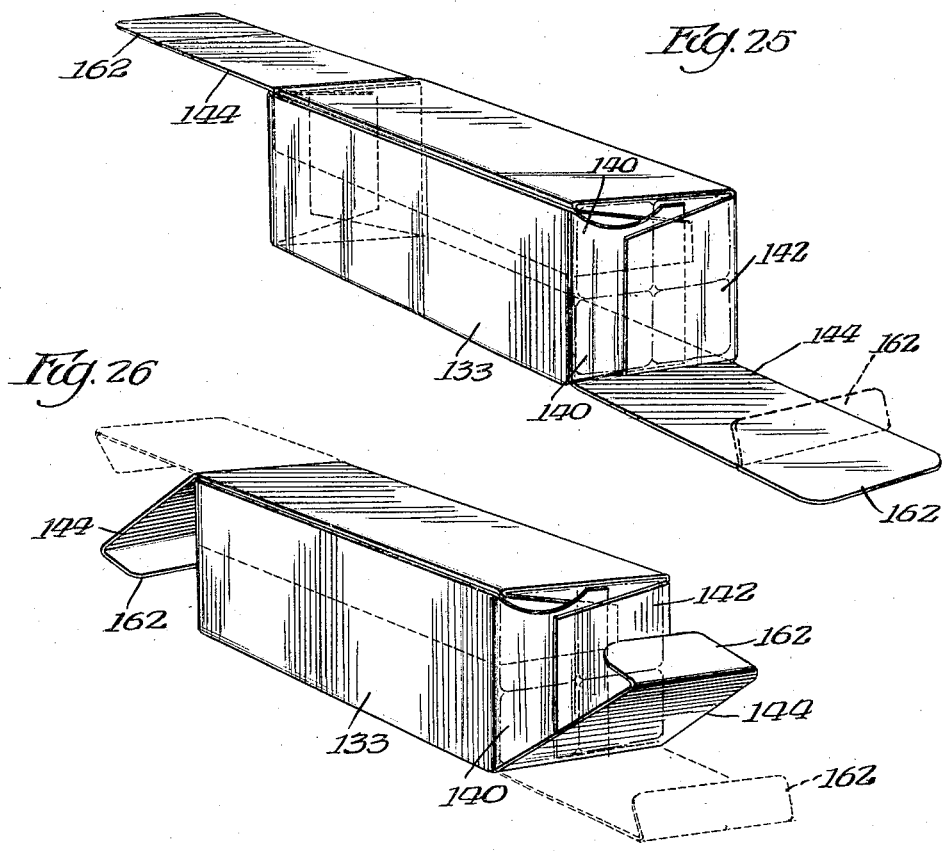

Patented May 5, 1931

1,803,633

UNITED STATES PATENT OFFICE

WES W. McCAIN, OF OAK PARK, ILLINOIS, ASSIGNOR, BY MESNE ASSIGNMENTS, TO CHERRY-BURRELL CORPORATION, OF WILMINGTON, DELAWARE, A CORPORATION OF DELAWARE

CARTONING MACHINE

Application filed February 17, 1928. Serial No. 255,004.

This invention relates to cartoning machines in general and particularly to butter cartoning machines.

The primary object of the invention is to provide a machine which will assemble four one-quarter pound prints of butter and enclose them in a single carton.

Another object is to provide a machine which will fold a blank carton on certain score lines and then place the butter in a pocket thus formed instead of folding the carton by ramming the butter against it.

Another object is to provide a machine which will start and stop the traveling carton at various stages and positively engage and release the carton and its contents without sharp starting and stopping movements thereby preventing mutilation of the carton and damage to its contents.

Another object is to provide a machine which has relatively slow acceleration and deceleration, thereby preventing rebound of the carton, and eliminating the necessity of positive stops.

Another object is to provide a machine which is correctly balanced to positively and neatly carton four one quarter pound prints into a one pound wrapper at a high rate of speed.

And a further object is to provide a machine which is efficient in operation, strong and durable in construction and which is compact and requires only a small amount of floor space.

In the accompanying drawings illustrating a selected embodiment of the invention the views are as follows:

Fig. 17, is a detail perspective view of panel folding levers which fold in the top side flap.

Fig. 18, is a perspective view of end flap tip folding fingers.

Fig. 19, is a perspective view of the end flap folding member.

Fig. 20, is a perspective view of the blades and the cooperating mechanism for inserting the end flap tip.

Fig. 21, is a detail view of the mechanism for operating the parts shown in Fig. 20.

Figs. 22 to 27 are diagrammatic views of the carton showing the various folding steps.

Figure 1:
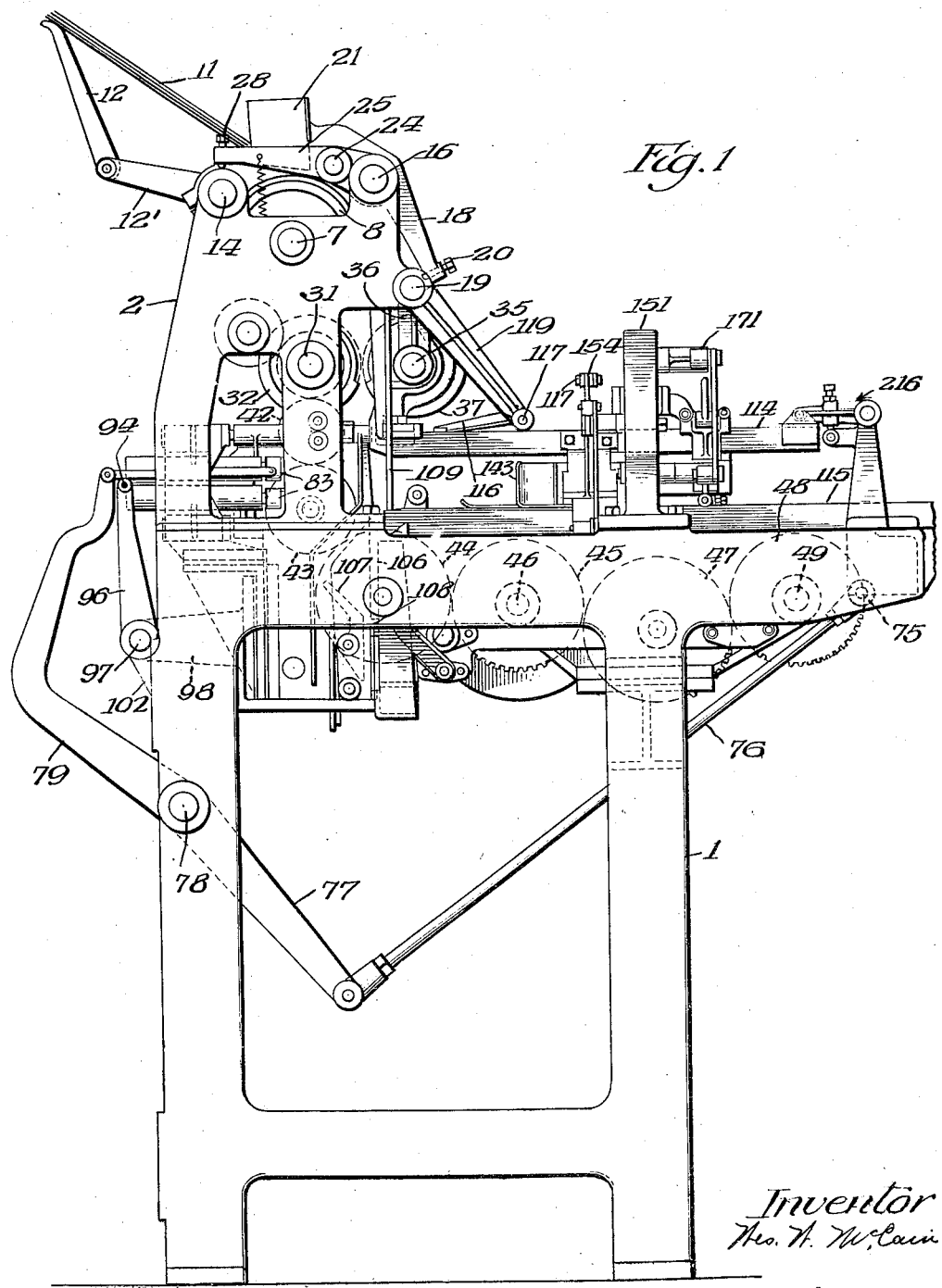
Fig. 1, is a side elevation of the machine embodying the invention.

Referring to the drawings 1 designates a supporting frame, upon which the sub frame 2 is attached. A sprocket 3 Fig. 8, loosely mounted on the shaft 4 fixed in the sub frame 2 is connected to a suitable means of power, such as a motor (not shown). A pinion 5 fixed to the sprocket 3 and integral therewith meshes with a gear 6, Figs. 2 and 8, fixed on the feed shaft 7 and rotates this shaft. The feed shaft has fixed thereon a plurality of feed rollers 8, Figs. 4 and 8, each carrying a plate 9, which is provided with teeth or pins 10. These pins engage one of a plurality of cartons 11 which are supported between arms 12 and top caliper arms 13, Figs. 1 and 4.

Figure 4:
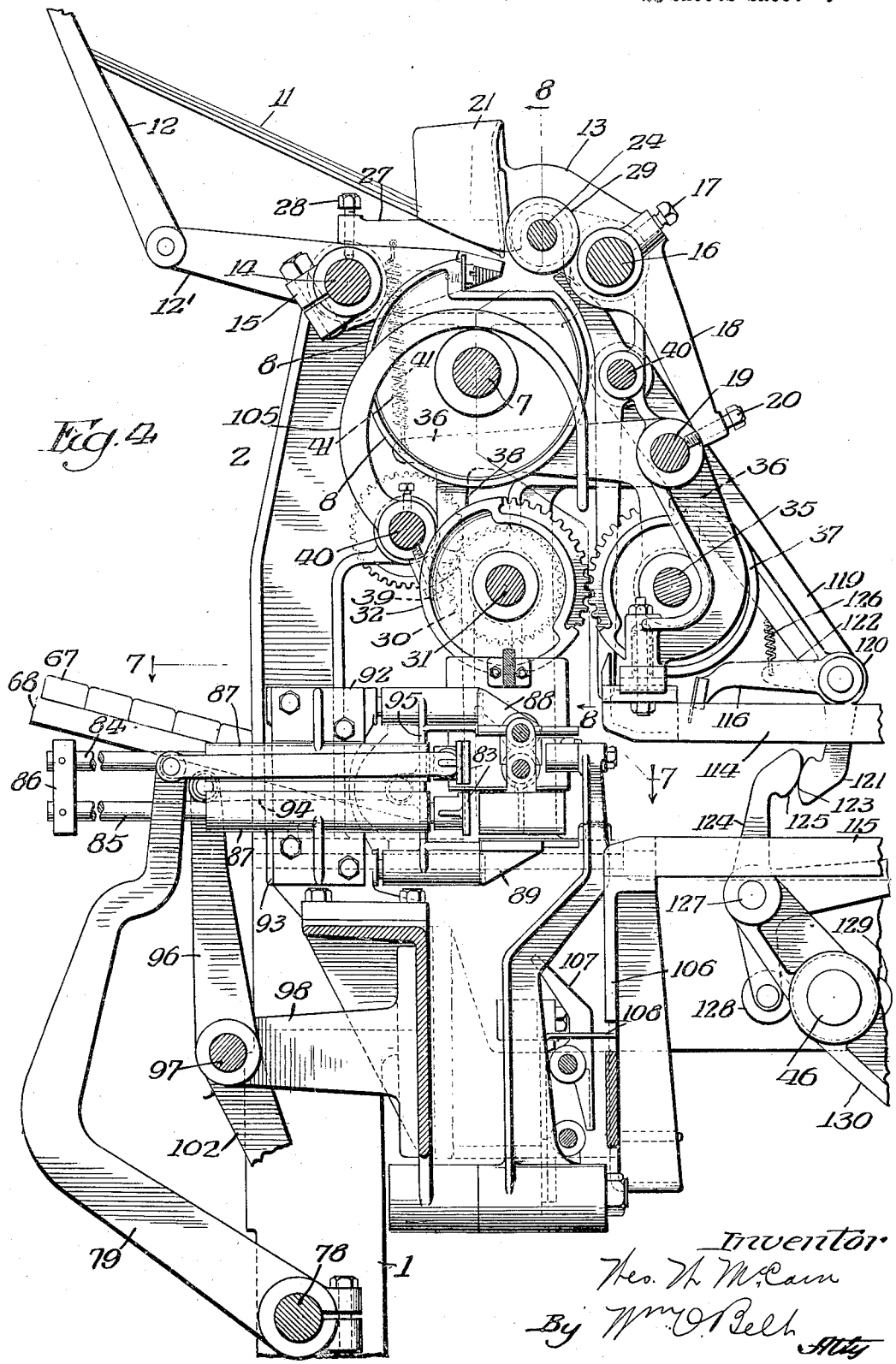
Fig. 4, is an enlarged central longitudinal vertical section of the front end of the machine showing the cartoning and butter feeding mechanism.
Figure 8:
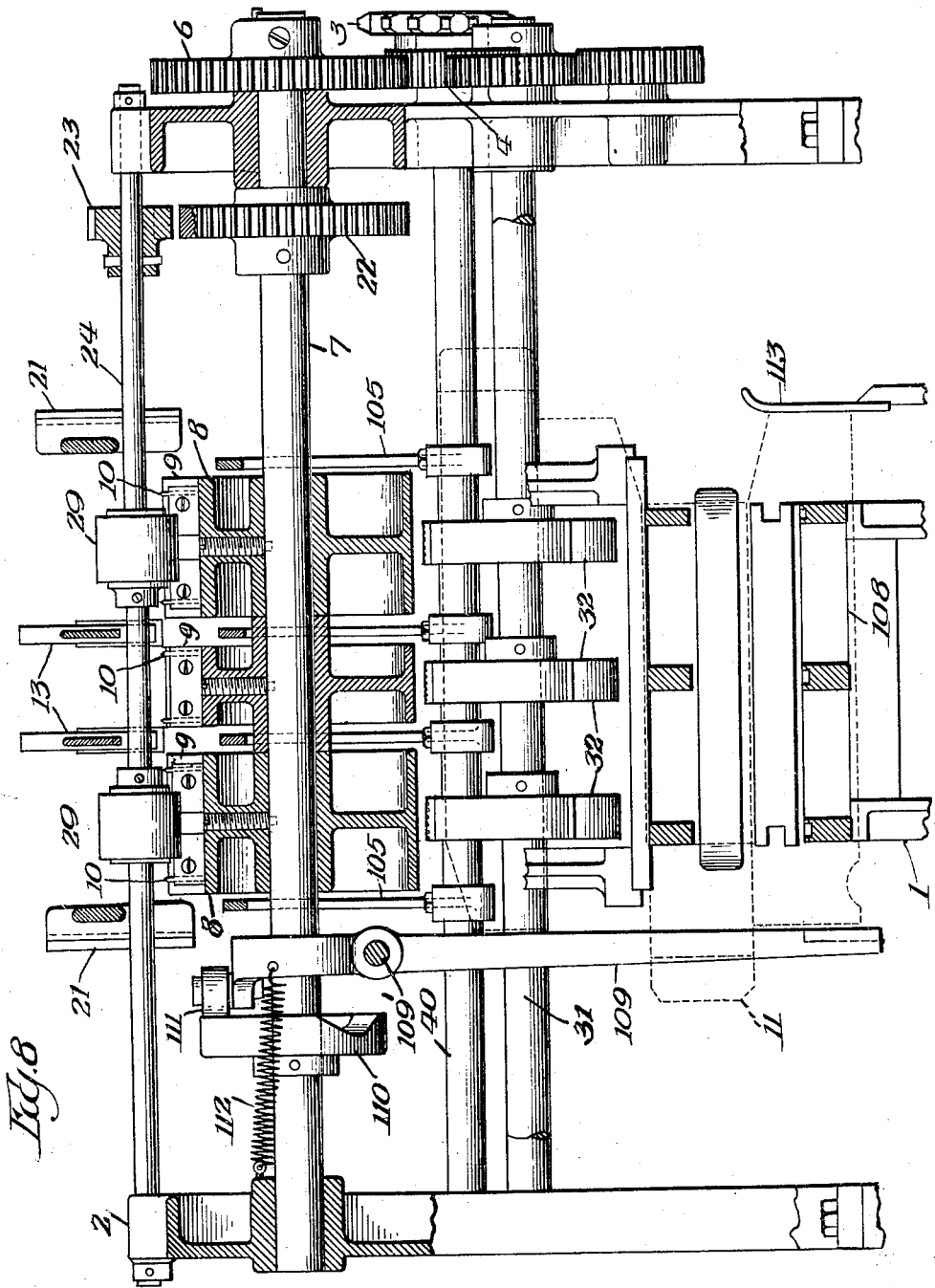
Fig. 8, is a transverse sectional view on the line 8—8 of Fig. 4 showing the upper part of the machine.

The arms 12 are adjustably supported by a lever 12' which is mounted on the stationary shaft 14 supported in the frame. The lever 12' is arranged between a pair of bottom caliper arms 15 which are adjustably connected to the shaft 14 and which extend to the top caliper arms 13, Fig. 4. The top caliper arms 13 are mounted on a shaft 16 and may be fixed thereto by means of set screws 17, Figs. 2 and 4. The end 18 of the top caliper arms abut a stationary shaft 19 and set screws 20 in the arms are used to adjust the calipers to increase or decrease the space between the top calipers 13 and the lower caliper arms 15 depending upon the thickness of the cartons to be fed. End guides 21, Figs. 1, 4 and 8 are adjustably mounted on the shaft 16, Figs. 1, 2 and 4, and are adapted to be moved on this shaft to properly position the cartons. A gear 22, Fig. 8 fixed to the shaft 7 meshes with a pinion 23, Figs. 2 and 8, pinned on the roller shaft 24 which is loosely mounted in a pair of arms 25 and 26, Figs. 1, 2 and 4, mounted on the shaft 16. Each arm has an end 27 carrying a set screw 28 to provide for a slight adjustment of the rubber tractor rollers 29, Fig. 8, which normally bear against the feed rollers 8.

Figure 2:
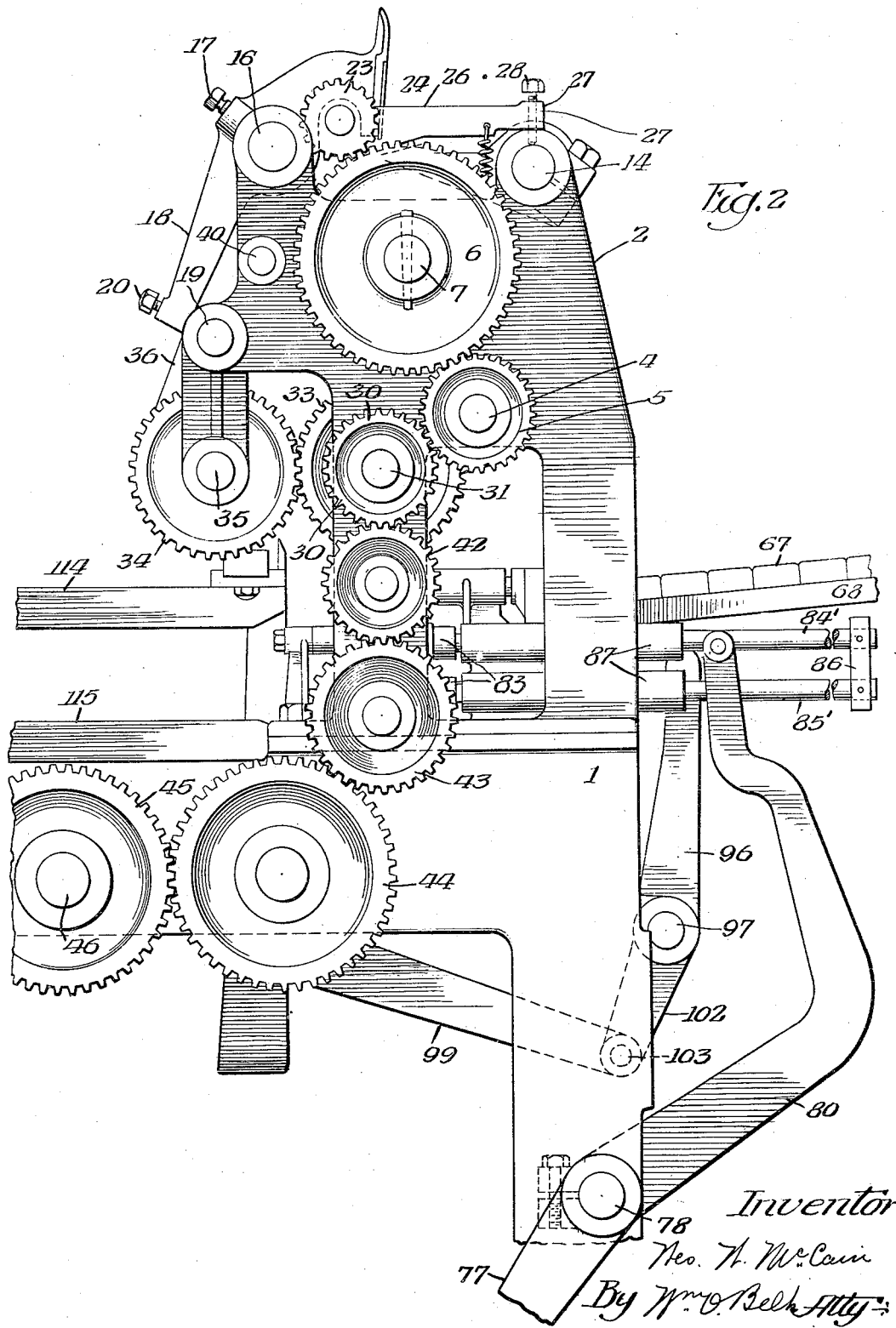
Fig. 2, is an enlarged side elevation of the front end of the machine on the side opposite to Fig. 1.
Figure 5:
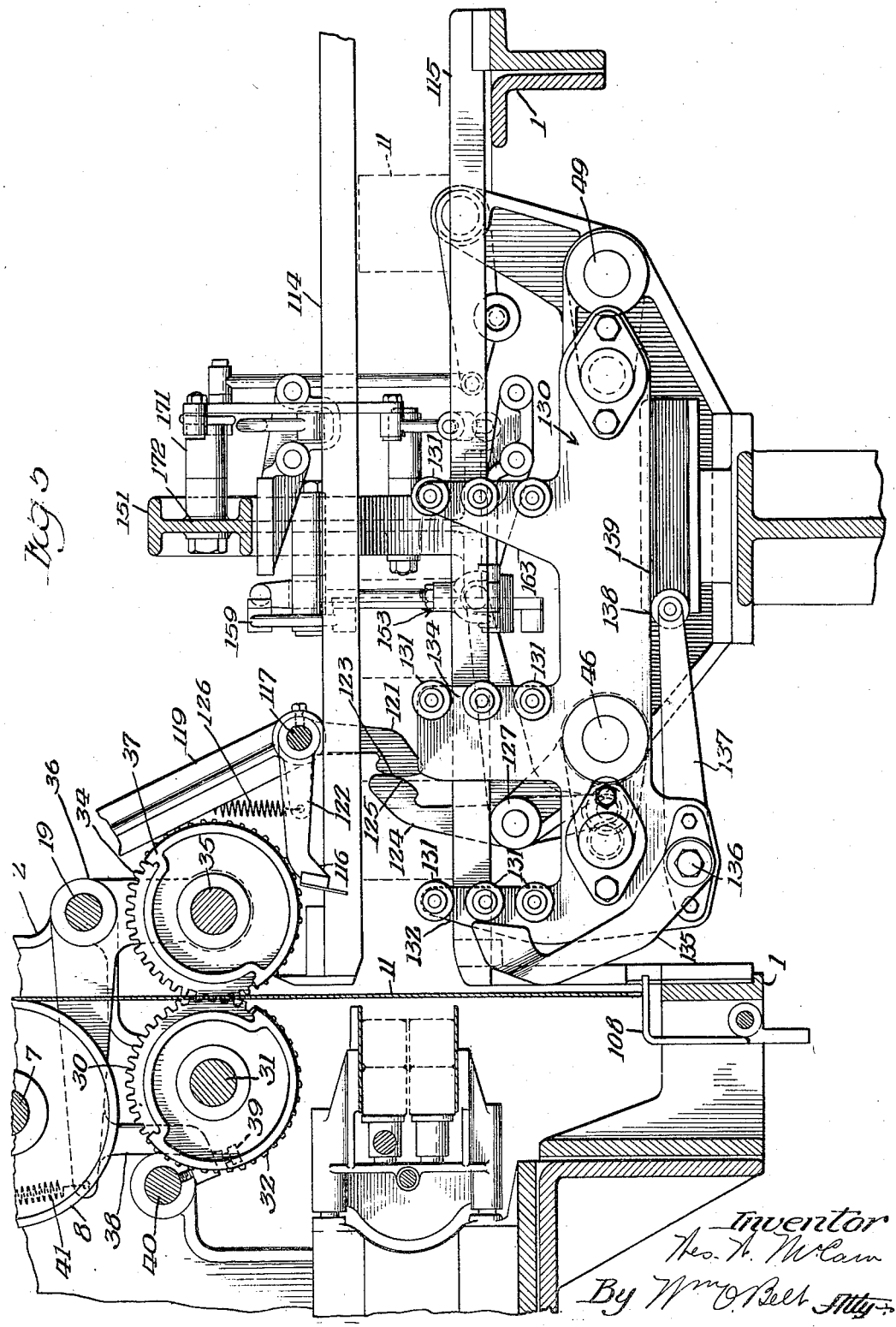
Fig. 5, is an enlarged central longitudinal vertical section of the rear end of the machine.

A gear 30, Figs. 2 and 4, fixed to the shaft 31 mounted in the frame 2 meshes with the gear 5 to rotate the shaft 31 which carries the mutilated feed rollers 32, Figs. 4 and 5. Another gear 33, Fig. 2, fixed to the shaft 31 meshes with and drives a gear 34 fixed to the shaft 35, which is mounted on a pair of angle levers 36, Figs. 4 and 5, loosely mounted on the stationary shaft 19. Three mutilated rollers 37, Figs. 1, 4 and 5, are fixed to the shaft 35 and engage the mutilated rollers 32 on the shaft 31. The arms 38 of the angle levers 36, Figs. 4 and 5 have set screws 39 in their outer ends which bear against a stationary shaft 40 fixed in the frame 2, to allow for adjustment of the mutilated roller shaft 35. A spring 41 is connected to the outer end of each angle lever 36 and to the ends 27 of the arms 25 and 26 and keeps the gear 23 in mesh with the gear 22, Fig. 8, and also keeps the gear 34 in mesh with the gear 33, Fig. 2.

Figure 3:
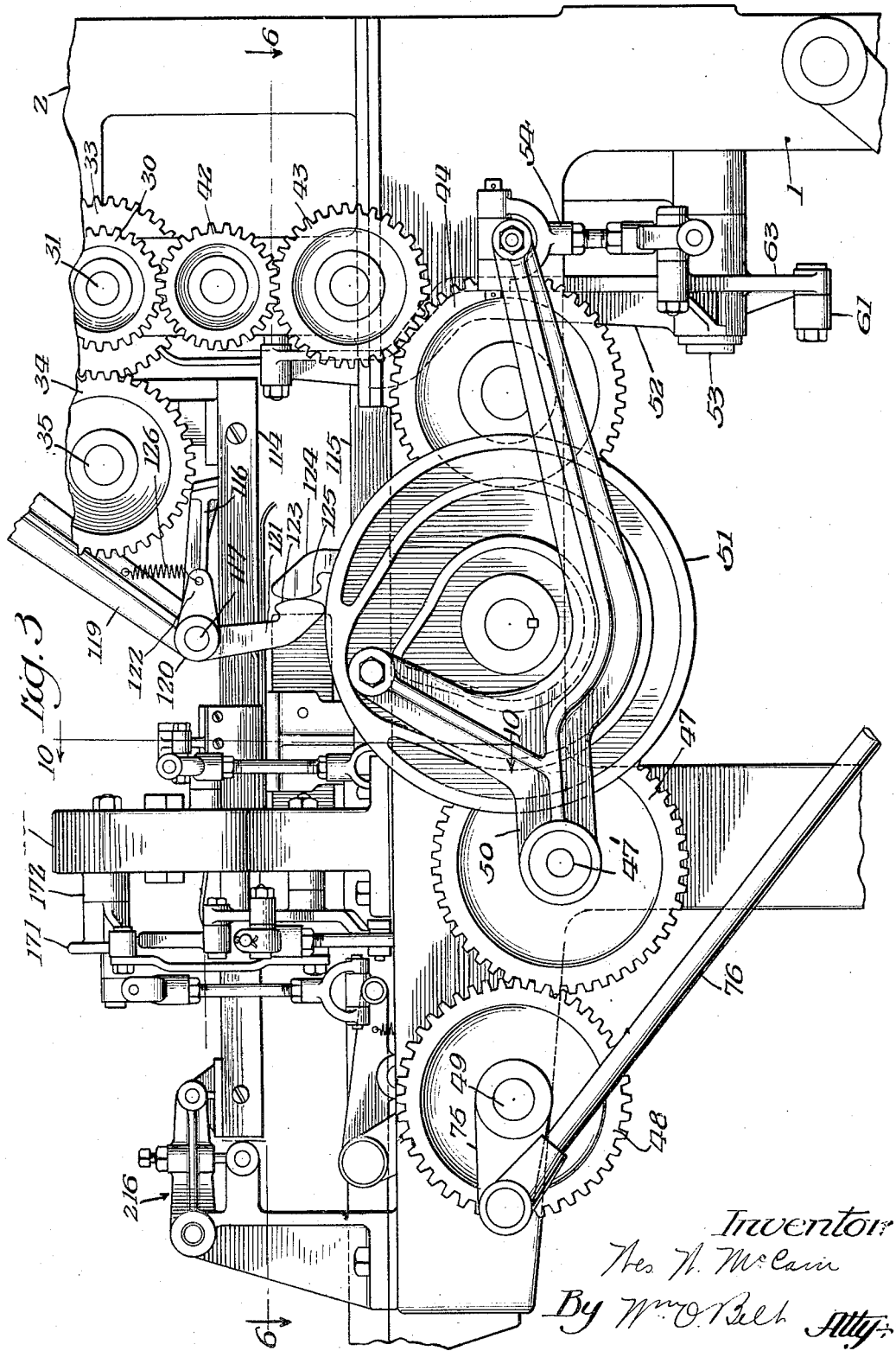
Fig. 3, is an enlarged side elevation of the machine.

An idler gear 42, Figs. 2 and 3, driven by the gear 30, meshes with and drives the idler gear 43. Another idler gear 44 driven by the idler 43 meshes with and drives a gear 45 fixed to the main crank shaft 46 and rotates this shaft. An idler gear 47, Fig. 3, driven by the crank shaft gear 45 drives a gear 48 on the crank shaft 49.

Figure 6:
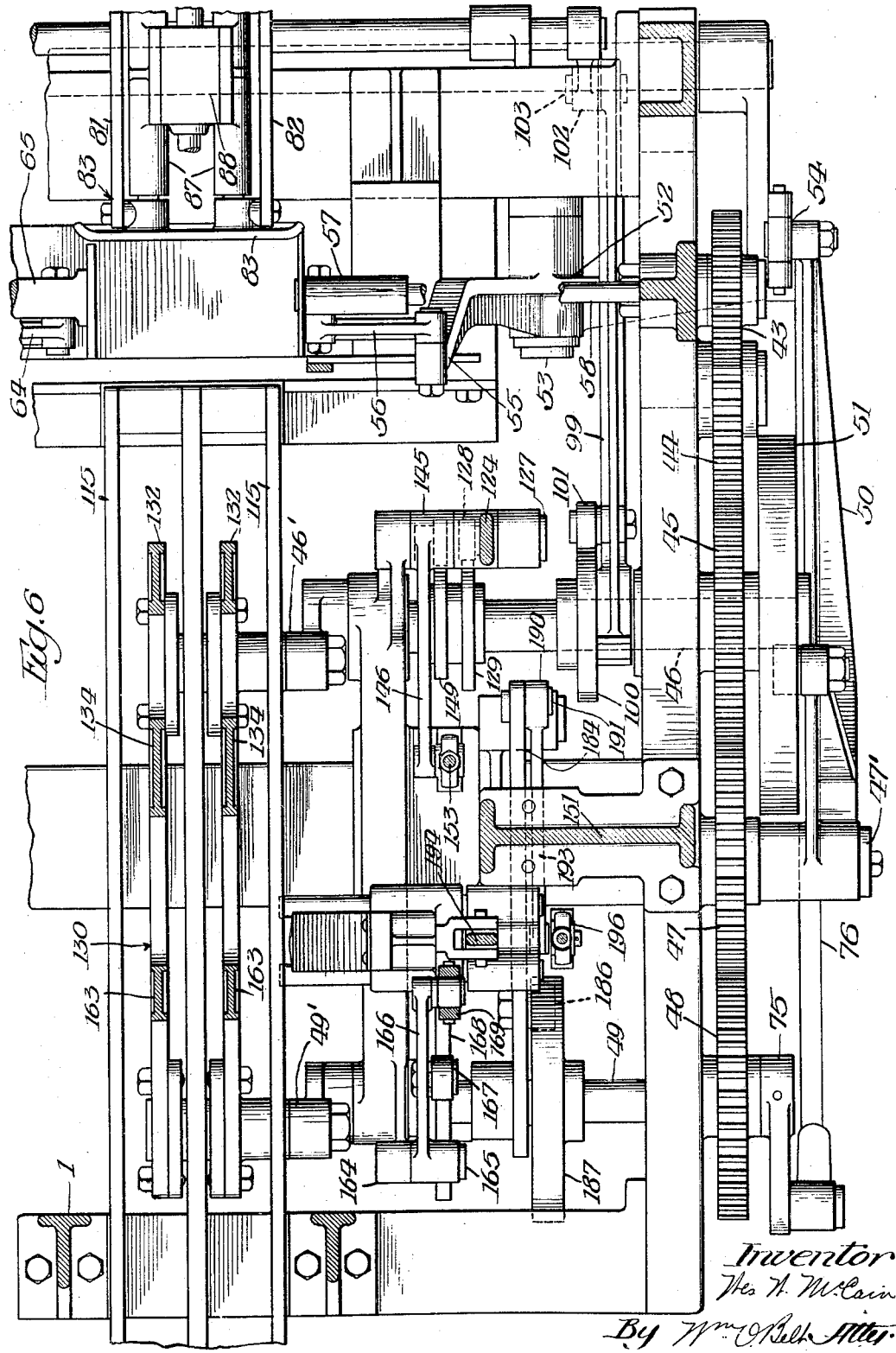
Fig. 6, is a sectional plan view on the line 6—6 of Fig. 3.
Figure 16:
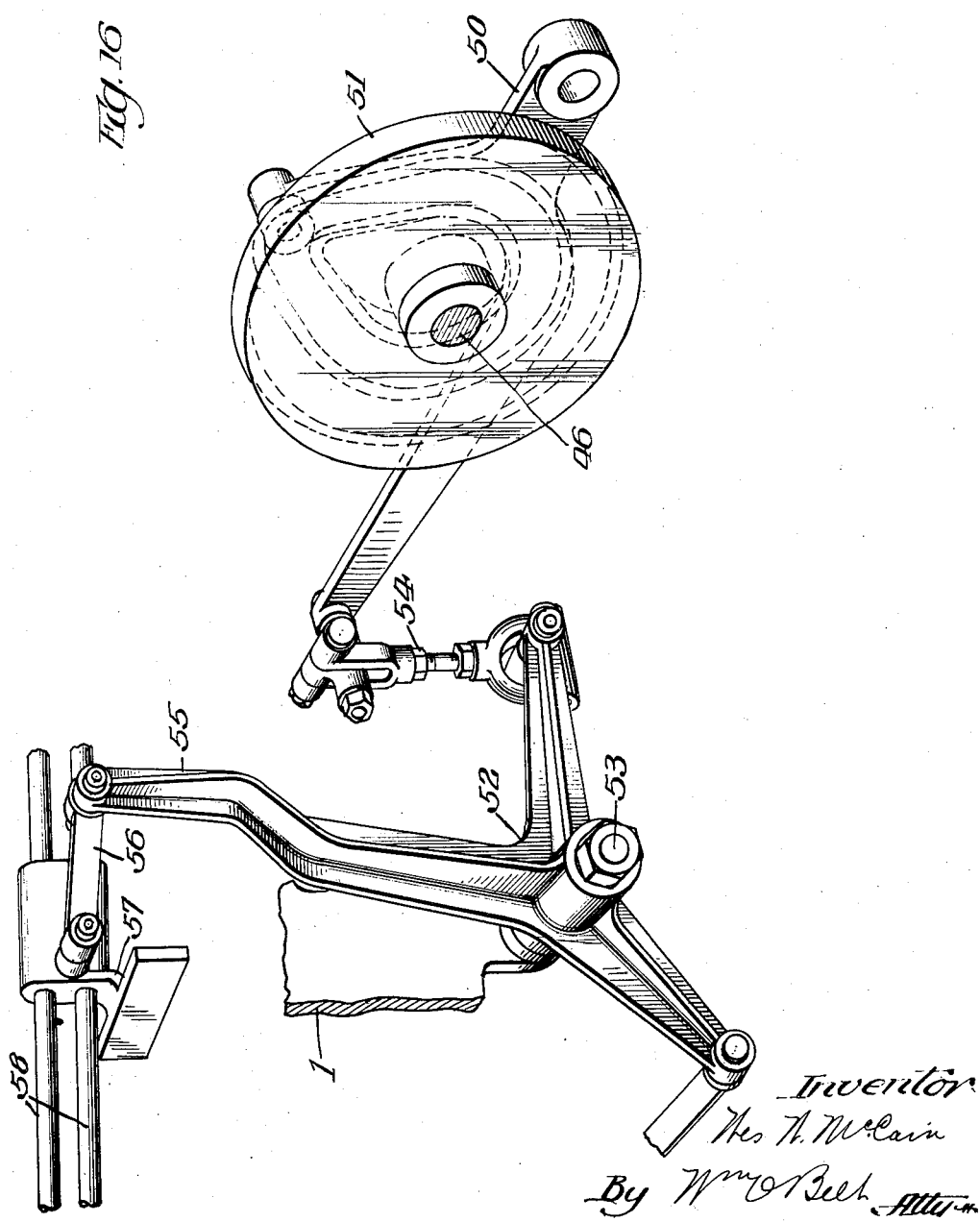
Fig. 16, is a detail perspective view of box cam and some of its co-operating mechanism.

A cam follower 50, Figs. 3, 6, 9 and 16, pivotally mounted on the stud shaft 47' is operated by the box cam 51, Figs. 3, 6 and 16. A three-arm collating lever 52 pivotally mounted on a stud shaft 53 carried by the frame 1 is reciprocated by the cam follower 50 through the universal coupling 54. The arm 55, Figs. 6, 9 and 16, of the three-arm collating lever 52, has a link 56 pivoted at its upper end which is pivotally connected to a collating head 57, slidably mounted on the collating support rods 58, Figs. 9 and 16. A second collating lever 59, Fig. 9, pivoted on a stud shaft 60 is operated by the link 61 pivotally connected to the arm 62 of the collating lever 59 and to the arm 63 of the three-arm collating lever 52. The lever 59 has a link 64 pivoted at its upper end which is pivotally connected to a collating head 65 slidably mounted on the collating support rods 66, Fig. 9.

Figure 7:
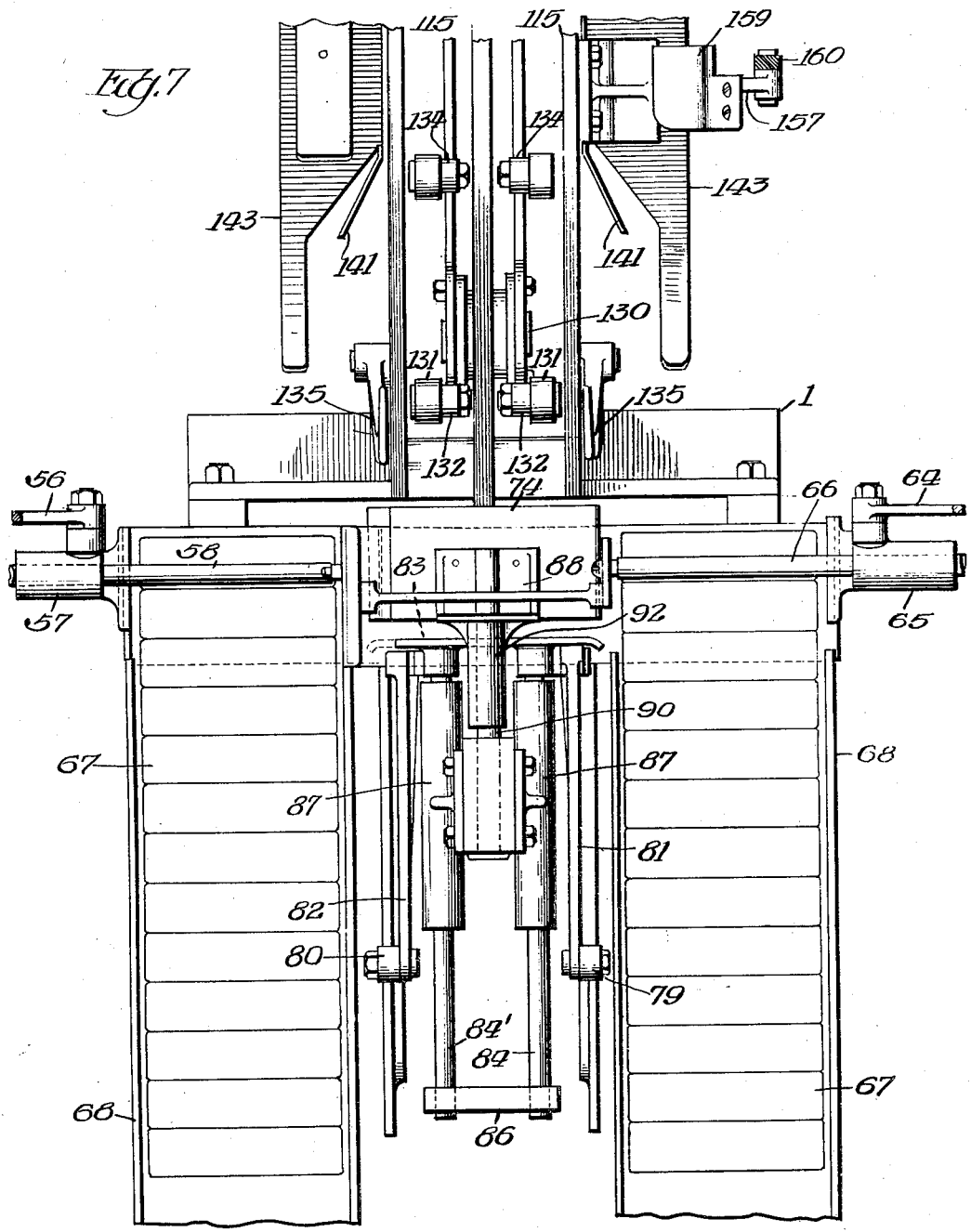
Fig. 7, is a detail sectional plan view taken on the line 7—7 of Fig. 4.
Figure 9:
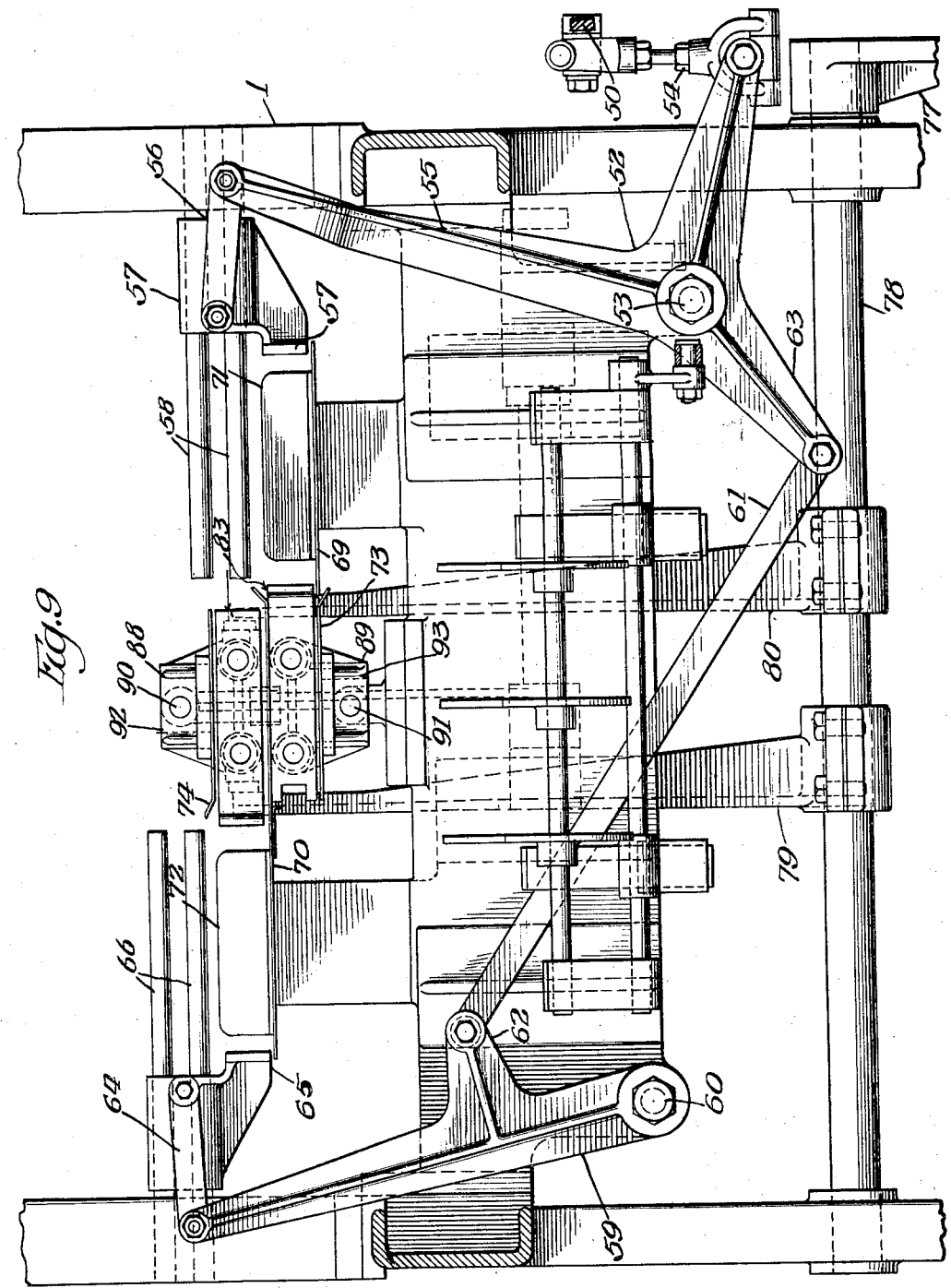
Fig. 9, is a transverse sectional view showing the lower part of the machine and the ramming mechanism.
Figure 10:
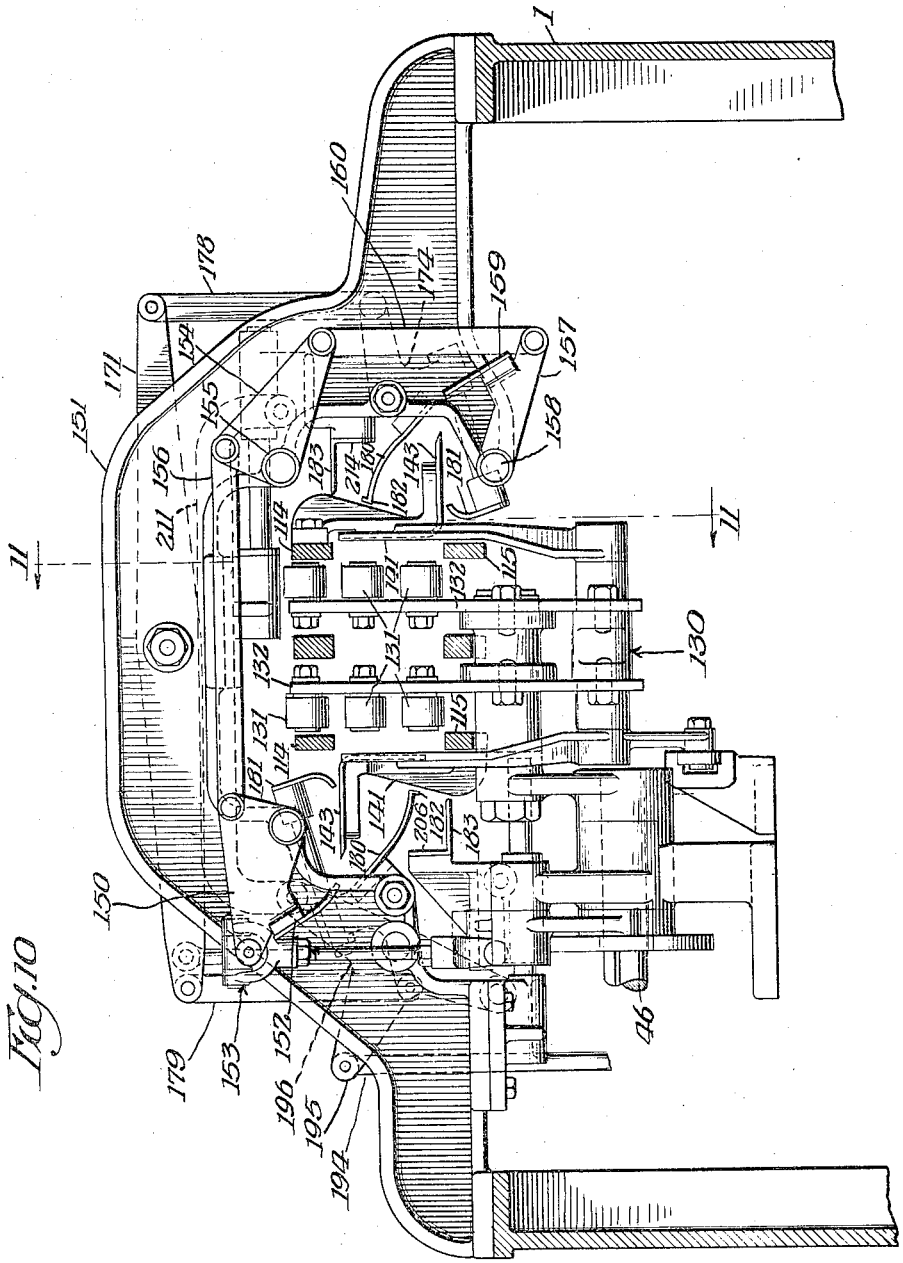
Fig. 10, is a transverse sectional view on the line 10—10 of Fig. 3.

Wrapped one quarter pound prints of butter 67 are fed on chutes 68, Figs. 4 and 7, to the supporting plates 69 and 70, Fig. 9, by suitable means (not shown). The supporting plate 70 is positioned in a plane higher than the plate 69, so that when the collating heads 57 and 65 move inwardly, two prints of butter will be moved inwardly along each of the supporting plates 69 and 70. The prints are guided by abutment plates 71 and 72, during movement thereof by the collating heads until they come to rest between the carton forming plates 73 and 74, where they will be stacked two high and two wide in regular pound print form, Fig. 9.

A crank arm 75, Figs. 1, 3 and 6 fixed to the crank shaft 49 has a rod 76 pivoted thereto which is pivotally connected to an arm 77, Figs. 1 and 9, fixed to the ram lever shaft 78, Figs. 1, 2, 4 and 9. The ram lever shaft is thus oscillated and it carries the ram levers 79 and 80. The upper ends of these levers are pivoted to links 81 and 82, Fig. 7, which are pivotally connected to the ram heads 83. The ram heads are fixed to the ram rods 84, 84' and 85, 85', Figs. 2, 4, 7 and 11. The rods have a plate 86 connecting them together so that during movement of the ram levers 79 and 80 the ram heads 83 will reciprocate back and forth in ram rod supporting bearings 87 which are fixed to the frame 1 in proper operating position, Figs. 2, 4, 7 and 11.

Figure 14:
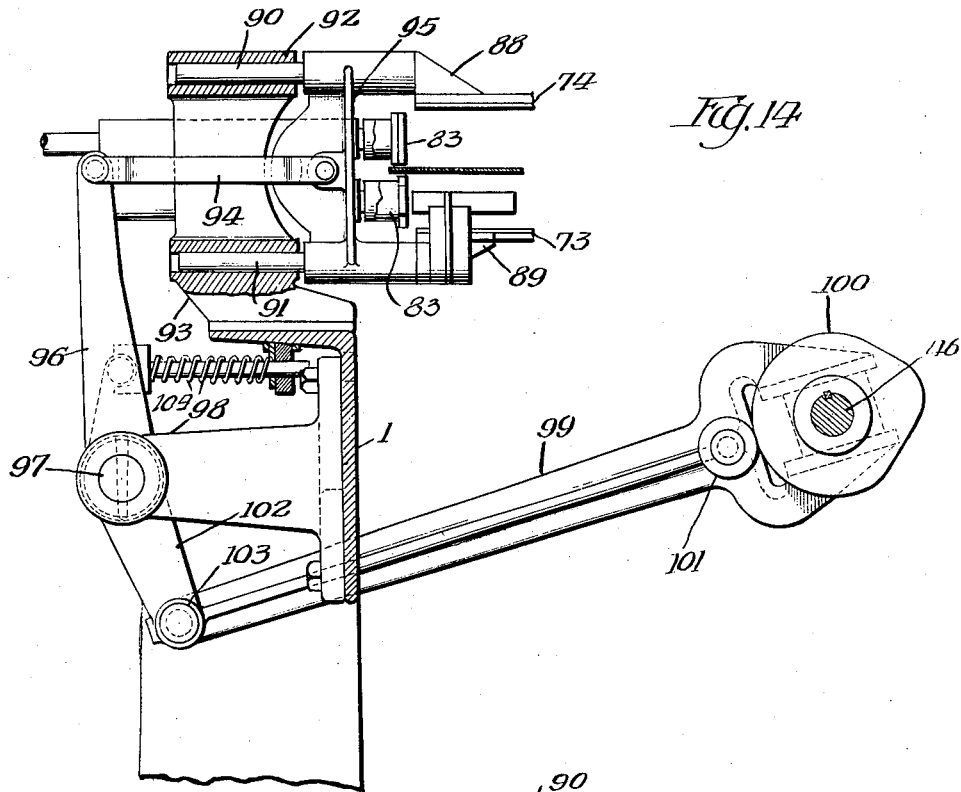
Fig. 14, is a longitudinal detail sectional view of the rams and some of the mechanism for operating the same.
Figure 15:
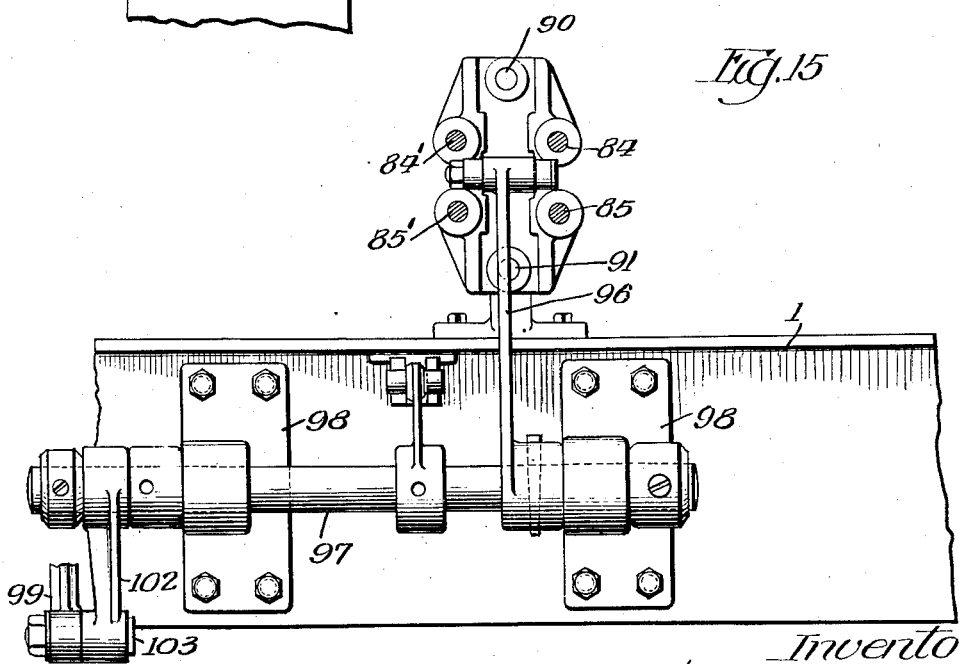
Fig. 15, is an end view of the parts shown in Fig. 14.

The carton forming plates 73 and 74 are fixed to heads 88 and 89, which are integrally connected together, Figs. 4, 9, 11 and 14. The heads are slidably carried on rods 90 and 91 fixed to the bearings 92 and 93 on the ram rod supporting bearings 87. A link 94, Figs. 1, 4 and 14 has one end pivoted to a strap 95, Figs. 4, 11 and 14, which connects the heads 88 and 89, Fig. 14, and has its other end pivotally connected to an arm 96 fixed to a rock shaft 97 mounted in bearings 98 fixed to the frame 1. A forked cam lever 99, Figs. 6 and 14, is operated by a cam 100 fixed to the main crank shaft 46 and a cam roller 101 on the cam lever 99 rides on this cam. A crank arm 102 fixed to the shaft 97 is pivotally connected to the cam lever 99 at 103 and causes oscillation, or rocking movement, of the shaft 97 for reciprocating the heads 88 and 89. A spring 104 keeps the cam lever in operable position relative to the crank shaft 46 and maintains the roller 101 against the cam 100 at all times.

Butter wrapping machines of the conventional type employ rams which ram the butter against the blank carton, to bend the carton. This method often causes mis-shaped and loose packages and causes mutilation and damage to the carton. The present machine does not ram the butter against the carton to fold it, but bends the carton first to form a pocket and then places four one-quarter pound prints in the pocket, thereby maintaining full rigidity of the carton and preventing mutilation and distortion of the package. The present machine is also provided with means to crease the carton along the score lines and also to bridge the gap through which the blank carton passes as it is fed to proper position.

Blank cartons are supported on the arms 12 and the caliper arms 15 where they are engaged by the teeth on the feed rollers and placed between the tractor rollers 29 which continue the feeding operation until the carton is engaged by the mutilated rollers. Curved strippers 105 arranged between the feed rollers and fixed on the stationary shaft 40, release the carton from the teeth, Figs. 4 and 8, as the carton is engaged by the mutilated rollers. The blank cartons are fed between the plate 106 and the guide fingers 107 by these mutilated rollers, Figs. 1 and 4, to a pair of plates 108, Figs. 4 and 5, where they are urged into proper side position by an arm 109, Figs. 1 and 8. The arm 109 is pivotally connected to the stationary shaft 19, at 109' and at right angles thereto, Fig. 8, and is operated by a cam 110 fixed on the shaft 7. This arm carries a roller 111 which is pressed against the cam 110 by means of a spring 112, Fig. 8. This arrangement causes reciprocation of the arm 109 which pushes the blank carton against a stop 113, Fig. 8, fixed to one of the plates 108, and causes the carton to be properly positioned relative to the collating head.

The one quarter pound prints of butter 67 are fed in two rows, Fig. 7, into the path of the collating heads 57 and 65 and two prints of butter from each row are simultaneously moved inwardly, stacking the butter in the conventional one pound shape.

The ramming mechanism operates to move the ram heads 83; and at the same time the carton forming plates 73 and 74 carried by the heads 88 and 89 are operated. The plates 73 and 74 engage the carton and crease it before the heads 83 advance the butter to the carton.

Figure 11:
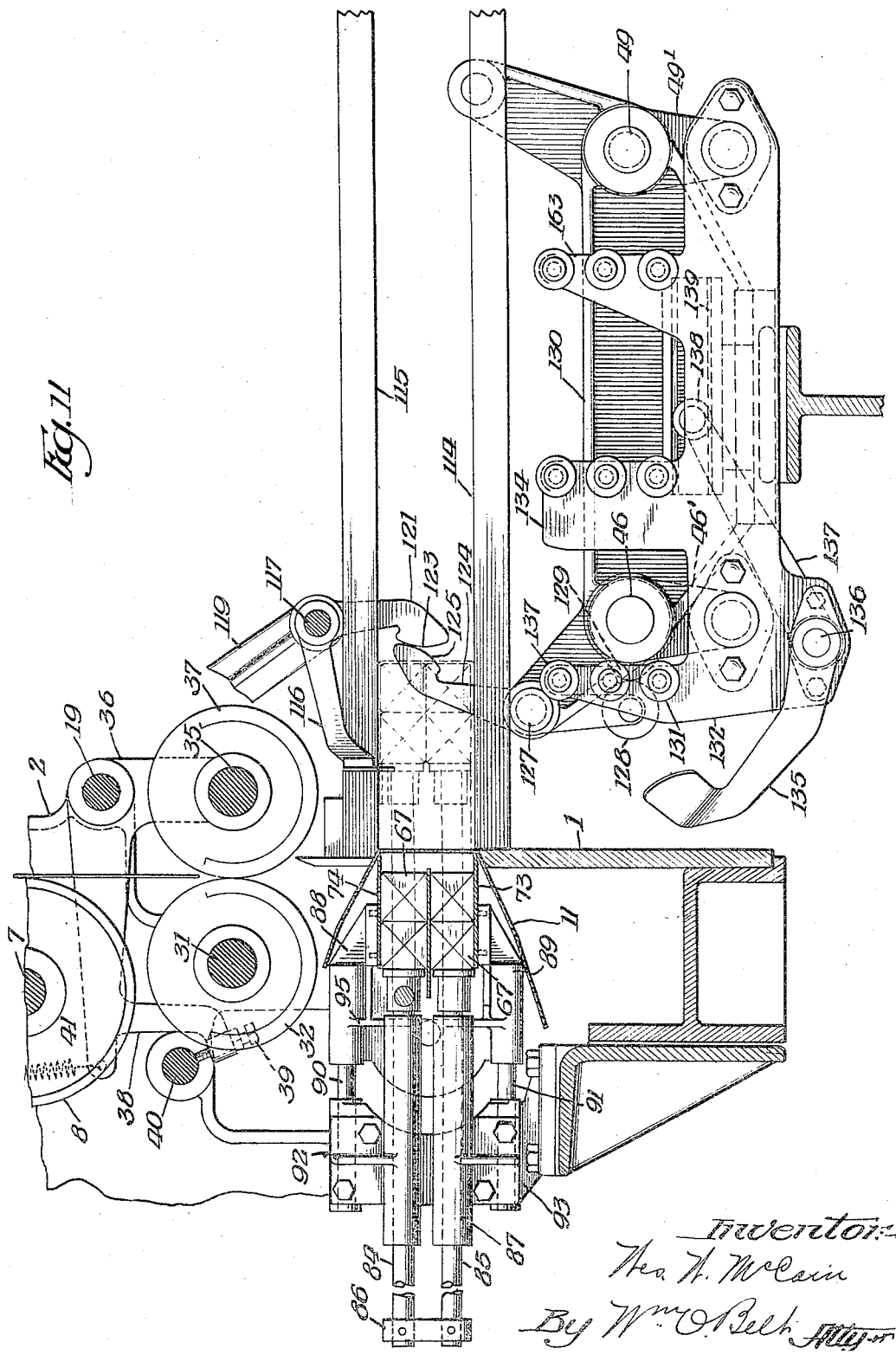
Figs. 11, 12 and 13 are longitudinal sectional views on the line 11—11 of Fig. 10, showing the conveyer and some of the parts in different positions.

As the carton forming mechanism folds the carton into a substantially U-shaped pocket, Fig. 22, the four prints of butter will be positioned therein as shown in Fig. 11, and the rams will position the butter between the upper guideways 114 and lower guideways 115 connected to the frame, Fig. 11. The rear panel folding levers 116, Fig. 17, fixed to the rod 117, Figs. 1, 4, 5, 11, 12 and 17, will move down and tuck in the carton panel 118, Fig. 22. The rod 117, more clearly shown in Fig. 17, is mounted in arms 119 fixed to the stationary shaft 19. This rod has an angle lever 120 fixed thereon which is provided with arms 121 and 122. The arm 121 is provided with a cam face 123 which is operated by the cam follower lever 124 having a face 125 which contacts with the face 123. A spring 126 connected to the arm 122 and to one of the arms 119 holds the arm 121 against the lever 124. The cam follower lever 124 is mounted on a stud shaft 127, Fig. 17, and carries a roller 128 which bears against a cam 129 fixed to the crank shaft 46, Fig. 17.

The panel folding levers 116 are continuously reciprocated and properly timed so that when the prints have been placed in the U-shaped pocket, the folding levers will fold the flap 118 from the position shown in Fig. 22, to the position shown in Fig. 23.

Figure 12:
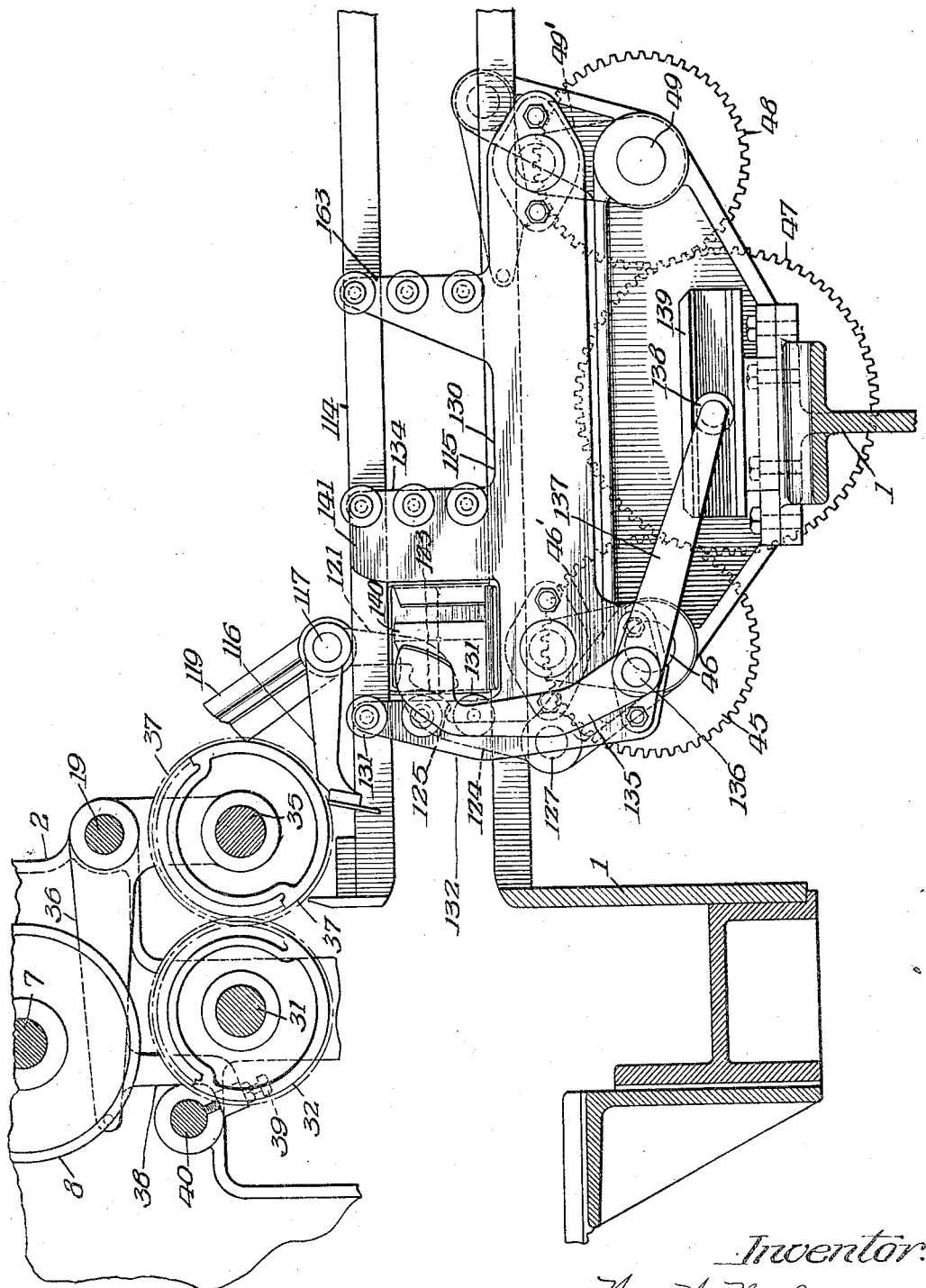
Figure 13:
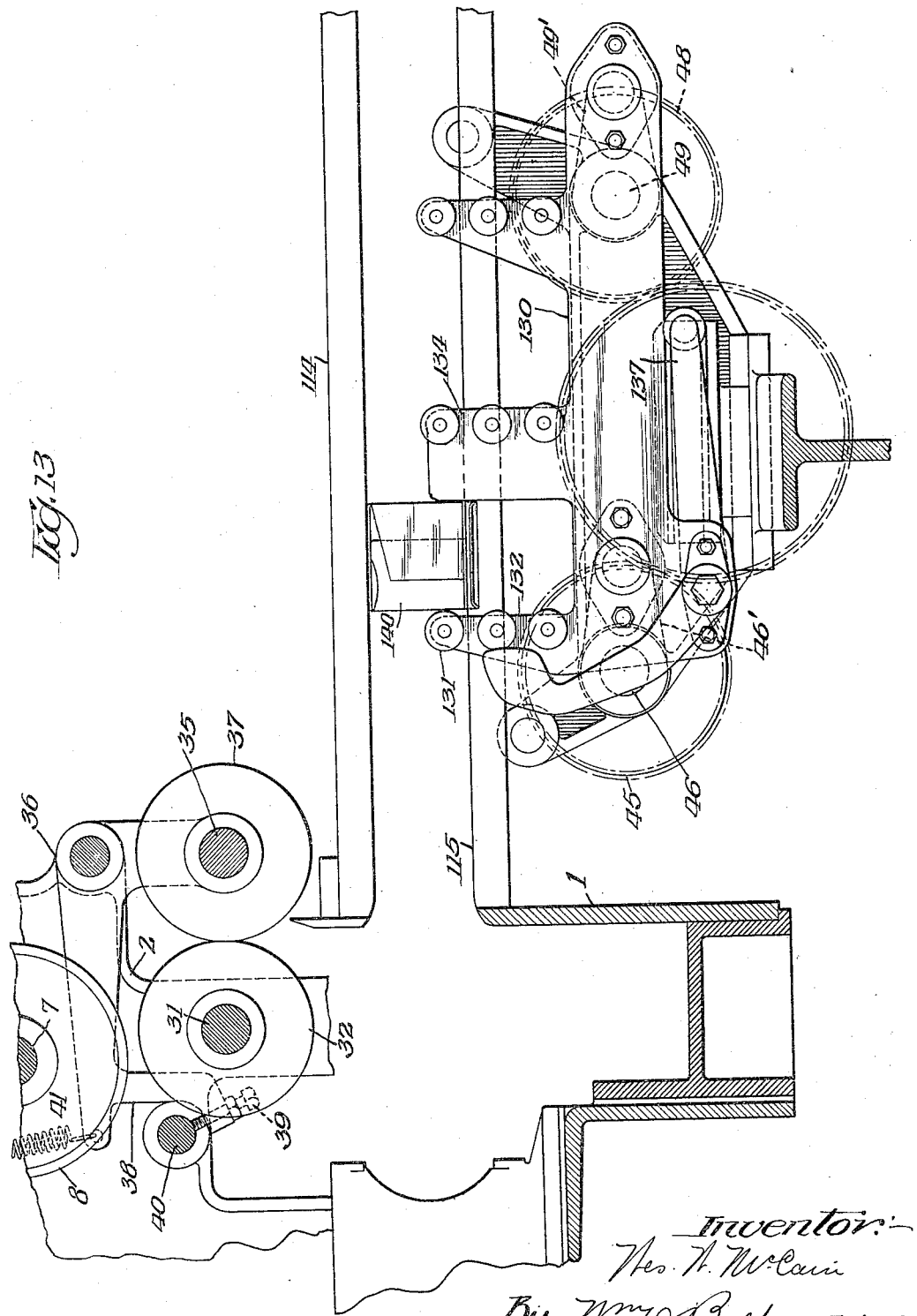

The prints in the semi-folded carton then remain stationary between the guideways 114 and 115 until the conveyer 130, Figs. 5, 6 and 10 to 13, carried by the crank arms 46' and 49', operated by the crank shafts 46 and 49, attains the position shown in Fig. 12 where the plurality of rollers 131 on the arms 132, Fig. 12, of the conveyer fold the carton panel 133 and hold the previously folded edge flap 118 in folded position as shown in Fig. 23. The prints remain between the guides 114 and 115 and between the arms 132 and 134 of the conveyer, and a pair of folding levers 135, Figs. 5 and 11 to 13, fixed to a stub shaft 136, mounted in the conveyer 130, will fold the carton end flaps 140 and the panel flap 118' from the position shown in Fig. 23, to the position shown in Fig. 24. Each folding lever is provided with an extension 137, more clearly shown in Figs. 5, 11 and 12, which carries a roller 138 traveling in a guide 139 fixed to a part of the frame 1.

Due to the parallel movement of crank shafts 46 and 49, the conveyer 130 will have planetary movement; and due to the part 137 operating in the guide 139, the folding levers will have oscillatory movement as they travel with the conveyer. The parts are so timed that after the panel 133 has been folded to its proper position, the carton with its contents will remain between the guideways 114 and 115 and between the conveyer arms 132 and 134, and hold the same in position until the folding levers 135 fold the carton flap 140, Fig. 24. The conveyer continues its planetary movement and moves the carton against a pair of abutment plates 141, Figs. 7, 10 and 12, suitably supported to a part of the frame, to fold the end flaps 142 from the position shown in Fig. 24 to the position shown in Fig. 25. Plates 143, Figs. 7 and 10, fixed to the plates 141 keep the end flaps 144 in flat position, Figs. 24 and 25, while the package is being moved forward on the guideways. The conveyer continues to move, Fig. 13, and after it has reached the end of its forward travel the carton will remain between the guideways 114 and 115 as the conveyer travels below the guideways, Fig. 11. As the conveyer continues its next cycle of operation the carton will be positioned between the conveyer arm 134 and 163.

An angle lever 145, provided with arms 146 and 147, is pivotally mounted on a pin 127, Figs. 6 and 18. A roller 148 carried by the arm 147 rides on a cam 149, fixed to the crank shaft 46. A bell crank 150, Figs. 10 and 18, pivoted to a bridge 151 fixed to the main frame 1, has a blade 152 fixed thereto. A universal coupling 153 connected to the arm 146 of the angle level 145 and to the bell crank 150 imparts oscillatory movement to the bell crank and to the blade 152. A bell crank 154 pivoted to the opposite side of the bridge at 155 has a link 156 pivoted thereto which is also pivoted to the bell crank 150. A link 157 on the stub shaft 158 mounted in the bridge 151 carries a blade 159. A link 160 pivoted to the link 157 and to the bell crank 154 causes oscillatory movement of the blade 159. Through the parts just described the blade 159 will operate simultaneously with the blade 152. A spring 161 connected to the link 157 and to a part of the supporting frame 1 keeps the roller 148 against the cam 149 at all times to insure proper coordinated operation of the blades. As the package assumes its proper position with end flaps 144 under the plates 143 the blades 152 and 159 will simultaneously move inwardly and fold the flap tips 162 from the position shown in full lines to the position shown in broken lines in Fig. 25.

The conveyer 130 having completed its first cycle of operation returns to carrying position and the carton will be between the conveyer arms 134 and the arms 163. The arms 134 are also provided with a plurality of rollers 131 which bear against the rearward edge of the carton to properly position the carton without marring the same or its contents, as the conveyer not only moves forwardly, but upwardly as well. Thus, the rollers keep from distorting or mutilating the carton and print.

An arm 164, Fig. 19, fixed to a part of the frame 1 carries a pin 165 upon which a cam follower lever 166 is mounted. This lever has a roller 167 which rides on a cam 168 fixed on the shaft 49 and causes vertical movement of the lever 166. A coupling 169 connects the lever 166 to a link 170 which is pivotally connected to a rocker arm 171 pivoted to the bridge 151 at 172. A spring 173 connected to the lever 166 and to a part of the main frame keeps the roller 167 against the cam 168. A pair of oppositely disposed levers 174 and 175 are pivoted to the main frame at 176 and 177 respectively. Links 178 and 179 pivotally connect these levers to the rocker arm 171 as clearly shown in Fig. 19. Each lever is provided with a bifurcated curved plate 180 against which an end flap 144 of the carton engages. The flap is guided by the curved plate 180 as it is folded by the folding finger 181 to the position shown in full lines in Fig. 25. The plates 180, Fig. 19, are provided with lugs 182 which come to bear against the end of the carton after it is closed and prevents the tip from coming out during the return stroke of the blades 183. The folding fingers are fixed to the levers 174 and 175 and move with the plates 180 due to parts just described which are controlled by the cam 168.

A bifurcated cam follower 184, Figs. 6 and 21, is guided by a block 185 loose on the shaft 49, and carries a roller 186 which operates in a box cam 187 fixed to the crank shaft 49. The end 188, Fig. 21, of the lever 184 is pivoted to an arm 189 of a cam follower angle lever 190 which is pivotally mounted on a pin 191 mounted in a suitable bracket 192 fixed to a part of the frame 1. The arm 193 of the cam follower angle lever 190 is pivoted to a link 194 which is pivotally connected to an arm 195, Fig. 20, of a three-arm bell crank 196 which is pivotally mounted on the bridge 151 at 197, Fig. 20. A closing head support bracket 198 has a face plate 199 which is secured to the main frame. The closing head support bracket has fixed thereto a pair of rods 200 upon which the closing head 201 is slidably mounted. A pin 202 fixed in the closing head supports one end of a link 203 which has its other end pivotally connected to the bell crank arm 205, at 204. The parts just described cause horizontal reciprocation of the closing head 201 on the rods 200. The closing head is provided with a blade 183 which enters into the end of the carton to guide the main tip flap 162 as it is being pushed into the carton by the face 206 on the closing head 201.

A second closing head 207, Fig. 20, carrying a blade 183 is slidably mounted on the rods 208 which are fixed to the supporting head bracket 209. A face plate 210 integral with the supporting bracket 209 is fixed to the frame in the same manner as the face plate 199. A closing head connecting link or pitman rod 211 has one end thereof pivoted to an arm 212 of the bell crank 196, and its other end pivoted to a pin 213 mounted in the closing head 207. The closing head has a face 214 which engages the end of the carton to close the end flap. The heads 201 and 207 operate towards and away from each other simultaneously through the parts just described which are operated by the cam 187.

As the carton with its contents is now stationary between the guideways 114 and 115, the blades 183 enter the open or flapless edge of the carton and for a guide for the end flap tip 162. The faces 206 and 214 press against the end flat 144 and press it inwardly against the contents and force the flap tip 162 into place, from the position shown in Fig. 26, sealing the carton, Fig. 27. Simultaneously with the reverse or withdrawing movement of the blades 183 the curved plates 180 will retract, or return to normal position, and cause the lugs 182 to bear against the edges of the carton so that the blades may be cleanly withdrawn from the carton without affecting the flap 162.

After the carton has been completely folded, as shown in Fig. 27, the conveyer returns on its next cycle of operation and the arm 163 also carrying rollers 131 will strike the rear face of the folded carton and push it along the guideways 114 and 115. As the operation is repeated, the succeeding folded carton will push the first carton off the guideways, and under the guideway supporting and adjustment means 216, to a suitable position where the packages are removed and packed.

The operation of the machine having been explained during the progress of the description it is not deemed necessary to repeat the same at this time.

Changes may be made in the form, construction and arrangement of the parts without departing from the spirit of the invention or sacrificing any of the advantages thereof and I reserve the right to make all such changes as fairly fall within the scope of the following claims.

I claim:

1. A cartoning machine comprising carton feeding means, folding mechanism movable against the carton for partly folding a carton, means moving with said folding mechanism for inserting butter in said partly folded carton, and means operating after the insertion of said butter into said partly folded carton for folding the carton into a complete self-sustaining snugly fitting package about said butter.

2. A cartoning machine comprising carton feeding means, means for partly folding the carton and forming a U-shaped pocket open at one side, means independent of said folding means for inserting butter in said pocket through the open side, and means for folding the remaining unfolded carton parts to close said open side and the ends of the carton into a complete self-sustaining package snugly fitting said butter.

3. A cartoning machine comprising means for assembling a plurality of prints of butter, carton feeding means, means for partly folding the sides of the carton, means independent of the carton for arranging the assembled prints in the partly folded carton, and means for completely folding the carton into a self-sustaining package for the assembled prints of butter.

4. A cartoning machine comprising means for feeding a blank carton to folding position, folding mechanism for partly folding the sides of the carton in a predetermined pocket, means for placing a plurality of prints of butter in the semi-folded carton in engagement therewith, and means for completely folding the carton into a complete self-sustaining package snugly fitting the butter.

5. A cartoning machine comprising means for feeding a blank carton to folding position, means for folding the carton into a substantially U-shaped form and forming a pocket, means operating after the folding of the carton for placing a plurality of prints of butter in said pocket, and means for completely folding the carton about the butter into a complete self-sustaining package.

6. A cartoning machine comprising means for feeding a blank carton to folding position, means for folding the carton into a substantially U-shaped form and forming a pocket, means for stacking a plurality of prints of butter in position to be inserted into said pocket, means for inserting the stack in said pocket, means for completely folding the carton about said stack, and means for inserting the end flaps of said carton to form a complete self-sustaining package.

7. In a butter cartoning machine having means for feeding print butter to the machine in rows, means for moving a plurality of prints from each row inwardly and at different levels to stack the same, carton feeding means, means for partly folding the carton, means for moving the stacked prints forwardly into the partly folded carton, and means for completely folding the carton after the butter is inserted therein.

8. In a butter cartoning machine having means for feeding print butter to the machine in rows, means for moving a plurality of prints from each row inwardly and at different levels to stack the same, carton feeding means, means for partly folding the carton, means for moving the stacked prints forwardly into the partly folded carton, guideways for holding the carton, means for intermittently moving the carton along on said guideways, and means for completing the folding operation as the carton travels on said guideways.

9. In a butter cartoning machine having means for feeding print butter to the machine in rows, means for moving a plurality of prints from each row inwardly and at different levels to stack the same, carton feeding means, means for partly folding the carton, means for moving the stacked prints forwardly into the partly folded carton, guideways for holding the carton, panel folding lever for folding the carton panel flap, folding levers for folding an end flap, conveyer means for intermittently moving the carton along said guideways, means for folding another end flap as the carton is traveling on the guideways, and means for folding the main end flap.

10. In a butter cartoning machine having means for feeding print butter to the machine in rows, means for moving a plurality of prints from each row inwardly and at different levels to stack the same, carton feeding means, means for partly folding the carton, means for moving the stacked prints forwardly into the partly folded carton, guideways for holding the carton, panel folding levers for folding the carton panel flap, folding levers for folding an end flap, conveyer means for intermittently moving the carton along said guideways, means for folding another end flap as the carton is traveling on the guideways, means for folding the main end flap, and means for inserting the main end flap tip into the carton.

11. In a butter cartoning machine having means for feeding print butter to the machine in rows, means for moving a plurality of prints from each row inwardly and at different levels to stack the same, carton feeding means, means for partly folding the carton, means for moving the stacked prints forwardly into the partly folded carton, guideways for holding the carton, two panel folding lever for folding the carton panel flap, folding levers for folding an end flap, conveyer means for intermittently moving the carton along said guideways, stationary means for closing another end flap, means for folding the end main flap tip, means for folding the end main flap and means for inserting the end main flap tip into the carton.

12. In a butter cartoning machine having means for feeding print butter to the machine in rows, means for moving a plurality of prints from each row inwardly and at different levels to stack the same, carton feeding means, means for partly folding the carton, means for moving the stacked prints forwardly into the partly folded carton, guideways for holding the carton, panel folding levers for folding the carton panel flap, folding levers for folding an end flap, conveyer means for intermittently moving the carton along said guideways, stationary means for closing another end flap, means for holding the main end flap in straight position, blades for folding the main end flap tip relative to the main end flap, means for folding the main end flap, and means for inserting the main end flap tip into the carton.

13. In a butter cartoning machine having means for feeding print butter to the machine in rows, means for moving a plurality of prints from each row inwardly and at different levels to stack the same, carton feeding means, mean for partly folding the carton, means for moving the stacked prints forwardly into the partly folded carton, guideways for holding the carton, panel folding levers for folding the carton panel flap, folding levers for folding an end flap, conveyer means for intermittently moving the carton along said guideways, stationary means for closing another end flap, means for holding the main end flap in straight position, blades for folding the main end flap tip relative to the main end flap, plates for guiding the main end flap, folding fingers for folding the main end flap against the end of the carton and means for guiding the main end flap tip into the carton.

14. In a butter cartoning machine having means for feeding print butter to the machine in rows, means for moving a plurality of prints from each row inwardly and at different levels to stack the same, carton feeding means, means for partly folding the carton, means for moving the stacked prints forwardly into the partly folded carton, guideways for holding the carton, panel folding levers for folding the carton panel flap, folding levers for folding an end flap, conveyer means for intermittently moving the carton along said guideways, stationary means for closing another end flap, means for holding the main end flap in straight position, blades for folding the main end flap tip relative to the main end flap, plates for guiding the end flap, folding fingers for folding the main end flap against the end of the carton, and blades adapted to enter the carton to guide the flap tip.

15. In a butter cartoning machine having means for feeding print butter to the machine in rows, means for moving a plurality of prints from each row inwardly and at different levels to stack the same, carton feeding means, means for partly folding the carton, means for moving the stacked prints forwardly into the partly folded carton, guideways for holding the carton, panel folding levers for folding the carton panel flap, folding levers for folding an end flap, conveyor means for intermittently moving the carton along said guideways, stationary means for closing another end flap, means for holding the main end flap in straight position, blades for folding the main end flap tip relative to the main end flap, plates for holding and guiding the main end flap, folding fingers for folding the main end flap against the end of the carton, blades adapted to enter the carton to guide the flap tip, means for urging the flap tip in place, and means on said plates for holding the flap tip in position while the blades are withdrawn therefrom.

16. In a butter cartoning machine having means for feeding print butter to the machine in rows, a collating head for moving a plurality of prints from each row inwardly and at different levels to stack the same, carton feeding means, ramming means for moving the butter forwardly to the carton, carton forming means operating in advance of the ramming means for partly folding the carton before the butter is inserted therein by the ramming means, and folding means for completing the carton folding operation.

17. In a butter cartoning machine having means for feeding print butter to the machine in rows, a collating head for moving a plurality of prints from each row inwardly and at different levels to stack the same, carton feeding means, ramming means for moving the butter forwardly to the carton, carton forming means operating in advance of the ramming means for partly folding the carton before the butter is inserted therein by the ramming means, guideways for supporting the carton and butter, reciprocating panel folding levers for folding the sides of said carton, folding levers for folding an end flap, conveyer means for intermittently moving the carton along said guideways, stationary means for folding another end flap as the carton is being moved by the conveyer, blades for folding the main flap tip relative to the main end flap, curved plates for folding the main flap, reciprocating folding fingers for folding the main end flap against the carton, guiding means for causing the main flap tip to enter the carton, and means co-operating with the guiding means for maintaining the flap tip in position when the guiding means are moved away from the carton.

18. In a butter cartoning machine having means for feeding print butter to the machine in rows, a collating head for moving a plurality of prints from each row inwardly and at different levels to stack the same, carton feeding means, ramming means for moving the butter forwardly to the carton, carton forming means operating in advance of the ramming means for partly folding the carton before the butter is inserted therein by the ramming means, guideways for supporting the butter and carton, reciprocating panel folding levers for folding the sides of said carton, folding levers for folding an end flap, conveyer means for intermittently moving the carton along said guideways, stationary means for folding another end flap as the carton is being moved by the conveyer, blades for folding the main end flap tip relative to the main end flap, curved plates for folding the main end flap, reciprocating folding fingers for folding the main end flap against the carton, reciprocating blades adapted to enter the carton to guide the main end flap tip as the folding fingers bear against the carton ends, and means for maintaining said tip in position when the blades withdraw from the carton.

19. In a butter cartoning machine having means for feeding print butter to the machine in rows, a collating head for moving a plurality of prints from each row inwardly and at different levels to stack the same, carton feeding means, ramming means for moving the butter forwardly to the carton, carton forming means operating in advance of the ramming means for partly folding the carton before the butter is inserted therein by the ramming means, guideways for supporting the butter and carton, reciprocating panel folding levers for folding the sides of said carton, folding levers for folding an end flap, conveyer means for intermittently moving the carton along said guideways, stationary means for folding another end flap as the carton is being moved by the conveyer, blades for folding the main end flap tip relative to the main end flap, curved plates for guiding the main end flap, reciprocating folding fingers for folding the main end flap against the outer ends of the carton, reciprocating blades adapted to enter the carton to guide the main end flap tip as the folding fingers fold the main end flap against the carton ends, and means arranged on the ends of said curved plates and bearings against the outer ends of said carton for maintaining the flap tip in position as the folding fingers and the blades move away from said carton.

20. In a cartoning machine having means for feeding articles to the machine in rows, means for moving a plurality of articles from each row inwardly and at different levels to stack the same, means for moving the stacked articles into a partly folded carton, and means for completely folding the carton after the stacked articles are moved thereinto.

21. In a cartoning machine, feeding means for feeding articles to said machine in rows, means for moving a predetermined number of articles from each row toward each other at different levels to stack the same, means for moving said stacked articles into a partly folded carton, and means for completely folding the carton about the stacked articles.

WES W. McCAIN.